United States Patent
Singamsetti et al.

(10) Patent No.: US 8,867,787 B2
(45) Date of Patent: Oct. 21, 2014

(54) TURBINE INSPECTION SYSTEM, COMPUTER PROGRAM PRODUCT AND METHOD OF INSPECTING

(71) Applicant: General Electric Company, Schenectady, NY (US)

(72) Inventors: Venkata Nagendra Sathi Raju Singamsetti, Andhra Pradesh (IN); Harish Kumar Dontula, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 13/677,751

(22) Filed: Nov. 15, 2012

(65) Prior Publication Data

US 2014/0133697 A1　　May 15, 2014

(51) Int. Cl.
*G06K 9/00*　　(2006.01)
*G06T 7/00*　　(2006.01)
*G01H 1/00*　　(2006.01)

(52) U.S. Cl.
CPC ....... *G06T 7/001* (2013.01); *G06T 2207/30164* (2013.01)
USPC ............................................. 382/103; 73/660

(58) Field of Classification Search
USPC ............ 382/103, 141, 152, 352; 348/92, 169, 348/170, 171, 172, 352
See application file for complete search history.

(56) References Cited

U.S. PATENT DOCUMENTS

| | | | |
|---|---|---|---|
| 4,983,841 A | 1/1991 | Stewart et al. | |
| 6,195,891 B1 | 3/2001 | Chen et al. | |
| 6,668,655 B2* | 12/2003 | Harrold et al. | 73/660 |
| 6,907,358 B2* | 6/2005 | Suh et al. | 702/38 |
| 7,214,925 B2 | 5/2007 | Wagoner et al. | |
| 7,714,710 B2* | 5/2010 | Schwartz | 340/539.13 |
| 8,068,660 B2 | 11/2011 | Nair et al. | |

* cited by examiner

*Primary Examiner* — Abolfazl Tabatabai
(74) *Attorney, Agent, or Firm* — Hoffman Warnick LLC; Ernest G. Cusick

(57) ABSTRACT

The disclosure includes a system, a computer program product, and a method for inspecting a turbine system. In one embodiment, the system includes at least one computing device configured to inspect a turbine system by performing actions including: obtaining a set of pre-maintenance digital images of the turbine system, obtaining a set of post-maintenance digital images of the turbine system, comparing the set of pre-maintenance digital images with the set of post-maintenance digital images to identify an anomaly in the set of post-maintenance digital images, and comparing the set of post-maintenance digital image with a set of computer modeled image of the turbine system to determine a type of the anomaly in response to identifying the anomaly. The post-maintenance digital images depict the turbine system after a maintenance process has been performed on the turbine system.

20 Claims, 8 Drawing Sheets

TURBINE INSPECTION SYSTEM, COMPUTER PROGRAM PRODUCT AND METHOD OF INSPECTING

BACKGROUND OF THE INVENTION

1. Technical Field

The disclosure is related generally to an inspection system, and more particularly to an inspection system for a turbine system.

2. Related Art

Conventional turbine systems (e.g., gas turbine systems) often require regular maintenance to ensure the turbine system operates at a desired efficiency for the full operational life of the turbine system. Maintenance may be regularly scheduled, or may be performed on an as-needed basis due to emergencies or unexpected mechanical failure of the components of the turbine system. In either instance, maintenance frequently requires that the turbine system be completely shut down so turbine operators may safely and thoroughly perform the maintenance on the turbine system. During maintenance, the turbine operators typically inspect the components of the turbine system visually to determine what maintenance processes (e.g., replacement of parts, re-alignment, etc.) should be performed on the turbine system.

However, by relying on the turbine operator to visually inspect the turbine system, some maintenance needs may go undetected, e.g., due to human error, inadequate inspection or the turbine operator's inability to directly view specific portions of the turbine system. Even further, the turbine operator is conventionally responsible for inspecting the turbine system for foreign objects (e.g., tools used during maintenance) after performing the maintenance processes. However, due in part to the limited visibility within the turbine system, post-maintenance inspection can fail to identify all foreign objects still located within the turbine system.

BRIEF DESCRIPTION OF THE INVENTION

A turbine inspection system is disclosed. In one embodiment, a system for use in turbine inspection is disclosed. The system can include: at least one computing device configured to inspect a turbine system by performing actions including: obtaining a set of pre-maintenance digital images of the turbine system; obtaining a set of post-maintenance digital images of the turbine system, the post-maintenance digital images depicting the turbine system after a maintenance process has been performed on the turbine system; comparing the set of pre-maintenance digital images with the set of post-maintenance digital images to identify an anomaly in the set of post-maintenance digital images; and comparing the set of post-maintenance digital image with a set of computer modeled image of the turbine system to determine a type of the anomaly in response to identifying the anomaly.

A first aspect of the invention includes a system including: at least one computing device configured to inspect a turbine system by performing actions including: obtaining a set of pre-maintenance digital images of the turbine system; obtaining a set of post-maintenance digital images of the turbine system, the post-maintenance digital images depicting the turbine system after a maintenance process has been performed on the turbine system; comparing the set of pre-maintenance digital images with the set of post-maintenance digital images to identify an anomaly in the set of post-maintenance digital images; and comparing the set of post-maintenance digital image with a set of computer modeled image of the turbine system to determine a type of the anomaly in response to identifying the anomaly.

A second aspect of the invention includes A program product stored on a non-transitory computer readable medium for inspecting a turbine system, the non-transitory computer readable medium including program code for causing the computer system to: obtain a set of pre-maintenance digital images of the turbine system; obtain a set of post-maintenance digital images of the turbine system, the post-maintenance digital images depicting the turbine system after a maintenance process has been performed on the turbine system; compare the set of pre-maintenance digital images with the set of post-maintenance digital images to identify an anomaly in the set of post-maintenance digital images; and compare the set of post-maintenance digital image with a set of computer modeled image of the turbine system to determine a type of the anomaly in response to identifying the anomaly.

A third aspect of the invention includes a method of inspecting a turbine system. The method includes: obtaining a set of pre-maintenance digital images of the turbine system; obtaining a set of post-maintenance digital images of the turbine system, the post-maintenance digital images depicting the turbine system after a maintenance process has been performed on the turbine system; comparing the set of pre-maintenance digital images with the set of post-maintenance digital images to identify an anomaly in the set of post-maintenance digital images; and comparing the set of post-maintenance digital image with a set of computer modeled image of the turbine system to determine a type of the anomaly in response to identifying the anomaly.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
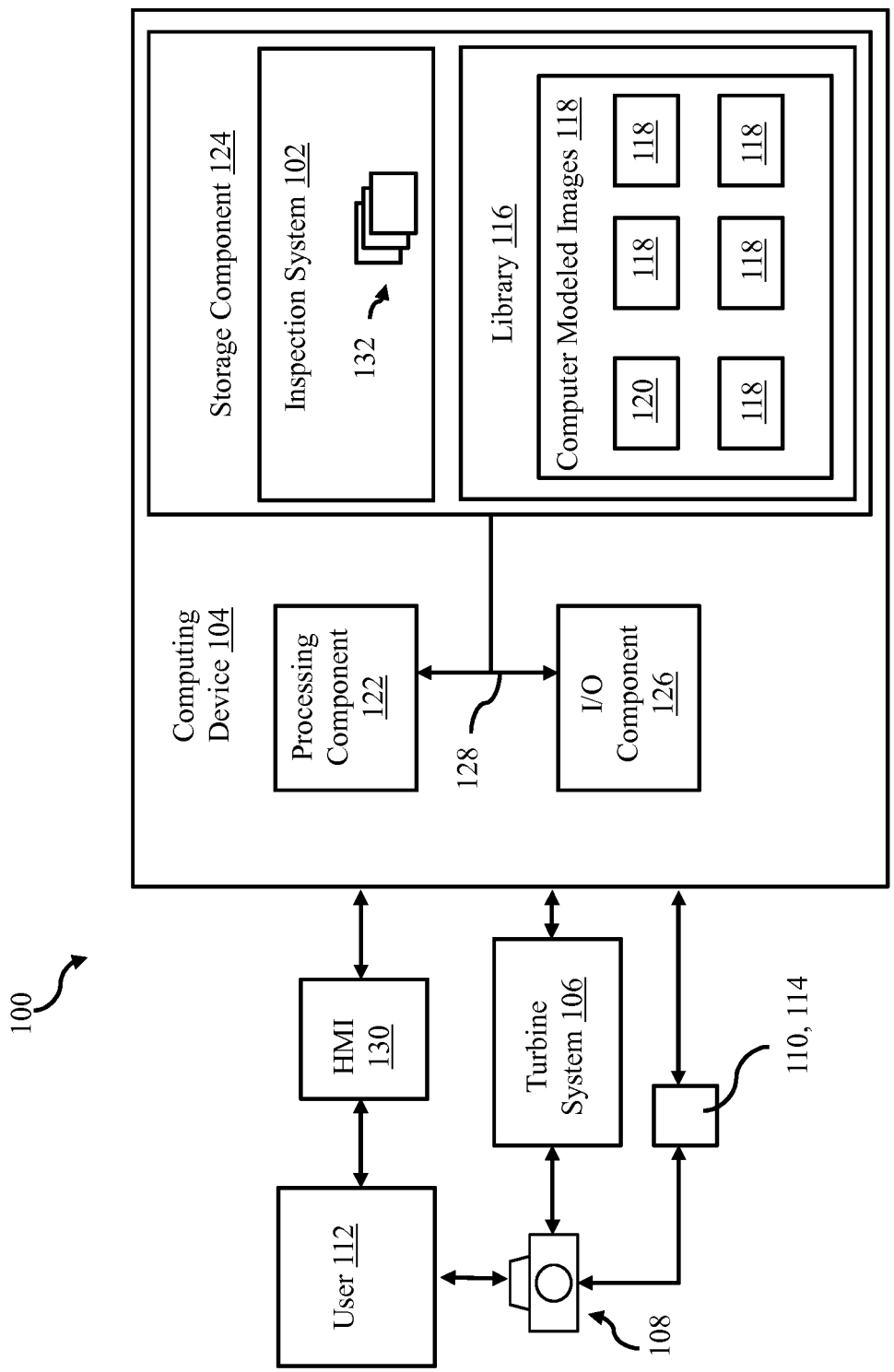
FIG. 1 shows an illustrative environment including an inspection system according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to an inspection system. Specifically, as described herein, aspects of the invention relate to an inspection system for a turbine system.

Turning to FIG. 1, an illustrative environment 100 including an inspection system 102 according to embodiments of the invention is provided. To this extent, the environment 100 includes a computing device 104 that can perform a process described herein in order to inspect a turbine system 106. In particular, the computing device 104 is shown as including inspection system 102, which makes computing device 104 operable to obtain images, compare images, identify anomalies, and determine types of anomalies in turbine system 106 by performing any/all of the processes described herein and implementing any/all of the embodiments described herein.

In an embodiment, as shown in FIG. 1, environment 100 may also include an industrial camera 108. Industrial camera 108 may capture a set of pre-maintenance digital images 110 of turbine system 106. More specifically, a user 112 (e.g., turbine system operator) may utilize industrial camera 108 to capture the set of pre-maintenance digital images 110 of turbine system 106 before maintenance processes, discussed below, are performed on the turbine system 106. Industrial camera 108 may include any now known or later developed high resolution digital camera. The set of pre-maintenance digital images 110 may include at least one digital image of turbine system 106. More specifically, the set of pre-maintenance digital images 110 may include a plurality of distinct digital images captured by user 112 using industrial camera 108. Each distinct, digital image of the set of pre-maintenance digital images 110 captures a different portion of turbine system 106, so inspection of turbine system 106, as discussed below, may be substantially thorough and complete.

Turbine system 106, as shown in FIG. 1, may be any conventional gas or steam turbine for generating power. More specifically, as shown in FIG. 1, and with reference to FIG. 3, turbine system 106 may be a conventional gas turbine including a compressor device (not shown), a combustor (not shown) in fluid communication with the compressor device, a turbine device 200 (FIG. 3) in fluid communication with the combustor and a shaft 202 (FIG. 3) coupling the compressor device and turbine device 200. Briefly turning to FIG. 3, turbine device 200 may include a plurality of buckets 204, 206 and a plurality of stator vanes 208-210 positioned between each of the plurality of buckets 204. Each of the plurality of stator vanes 208-210 may be coupled to the turbine housing 212. Additional basic functionality of majority of the components may be omitted for clarity.

Returning to FIG. 1, in an embodiment, environment 100 may also include a set of post-maintenance digital images 114. The set of post-maintenance digital images 114 may depict turbine system 106 after a maintenance process has been performed on turbine system 106. The maintenance process performed on turbine system 106 may include any conventional maintenance processes performed during the operational life of turbine system 106. For example, user 112 (e.g., turbine system operator) may perform a maintenance process on turbine system 106, which may include, but is not limited to, inspection, repair, refurbishing, component replacement, and cleaning. As similarly discussed above with reference to the set of pre-maintenance digital images 110, the set of post-maintenance digital images 114 of turbine system 106 may be captured by user 112 using industrial camera 108. The set of post-maintenance digital images 114 may include at least one digital image taken in an identical position of turbine system 106 as the at least one digital image of the set of pre-maintenance digital images 110. That is, all pre-maintenance digital images 110 and post-maintenance digital images 114 may be taken in identical positions within turbine system 106 before and after the maintenance process is performed. This capturing of the digital images in identical positions may provide for improved comparison of the set of pre-maintenance digital images 110 and the set of post-maintenance digital images 114, as discussed in more detail below.

Also shown in FIG. 1, computing device 104 may include a library 116. In an embodiment, as shown in FIG. 1, library 116 may include a plurality of computer modeled images 118 of a plurality of distinct turbine systems (e.g., turbine system 106). Also shown in FIG. 1, the plurality of computer modeled images 118 may include a set of computer modeled images 120 specific to turbine system 106 of environment 100, which may be used by inspection system 102 during a comparison process described below. Library 116 may be any conventional storage/memory device capable of storing data.

The computing device 104 is shown including a processing component 122 (e.g., one or more processors), a storage component 124 (e.g., a storage hierarchy), an input/output (I/O) component 126 (e.g., one or more I/O interfaces and/or devices), and a communications pathway 128. In general, the processing component 122 executes program code, such as the inspection system 102, which is at least partially fixed in the storage component 124. While executing program code, the processing component 122 can process data, which can result in reading and/or writing transformed data from/to the storage component 124 and/or the I/O component 126 for further processing. The pathway 128 provides a communications link between each of the components in the computing device 104. The I/O component 126 can comprise one or more human I/O devices, which enable a human user 112 (e.g., turbine system operator) to interact with the computing device 104 and/or one or more communications devices to enable a system user 112 to communicate with the computing device 104 using any type of communications link. In some embodiments, user 112 (e.g., turbine system operator) can interact with a human-machine interface 130, which allows user 112 to communicate with inspection system 102 of computing device 104. Human-machine interface 130 can include: an interactive touch screen, a graphical user display or any other conventional human-machine interface known in the art. To this extent, the inspection system 102 can manage a set of interfaces (e.g., graphical user interface(s), application program interface, etc.) that enable human and/or system users 112 to interact with the inspection system 102. Further, the inspection system 102 can manage (e.g., store, retrieve, create, manipulate, organize, present, etc.) data in the storage component 124, such as obtained digital images or computer modeled images using any solution. More specifically, inspection system 102 can store computer modeled images in library 116 as described in the process above.

In any event, the computing device 104 can comprise one or more general purpose computing articles of manufacture (e.g., computing devices) capable of executing program code, such as inspection system 102, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the inspection system 102 can be embodied as any combination of system software and/or application software.

Further, the inspection system 102 can be implemented using a set of modules 132. In this case, a module 132 can enable the computing device 104 to perform a set of tasks used by the inspection system 102, and can be separately developed and/or implemented apart from other portions of the inspection system 102. As used herein, the term "component" means any configuration of hardware, with or without software, which implements the functionality described in conjunction therewith using any solution, while the term "module" means program code that enables the computing device 104 to implement the functionality described in conjunction therewith using any solution. When fixed in a storage component 124 of a computing device 104 that includes a processing component 122, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computing device 104.

When the computing device 104 comprises multiple computing devices, each computing device may have only a portion of inspection system 102 fixed thereon (e.g., one or more modules 132). However, it is understood that the computing device 104 and inspection system 102 are only representative of various possible equivalent computer systems that may perform a process described herein. To this extent, in other embodiments, the functionality provided by the computing device 104 and inspection system 102 can be at least partially implemented by one or more computing devices that include any combination of general and/or specific purpose hardware with or without program code. In each embodiment, the hardware and program code, if included, can be created using standard engineering and programming techniques, respectively.

Regardless, when the computing device 104 includes multiple computing devices, the computing devices can communicate over any type of communications link. Further, while performing a process described herein, the computing device 104 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computing device 104 can obtain or provide data, such as the set of computer modeled images 120 of turbine system 106 using any solution. For example, the computing device 104 can obtain and/or retrieve the set of computer modeled images 120 from one or more data stores, receive the set of computer modeled images 120 from another system, send the set of computer modeled images 120 to another system, etc.

While shown and described herein as a system for inspecting a turbine system 106, it is understood that aspects of the invention further provide various alternative embodiments. For example, in one embodiment, the invention provides a computer program fixed in at least one computer-readable medium, which when executed, enables a computer system to inspect a turbine system. To this extent, the computer-readable medium includes program code, such as the inspection system 102 (FIG. 1), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a system for inspecting turbine system 106. In this case, a computer system, such as the computing device 104 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

Figure 2:
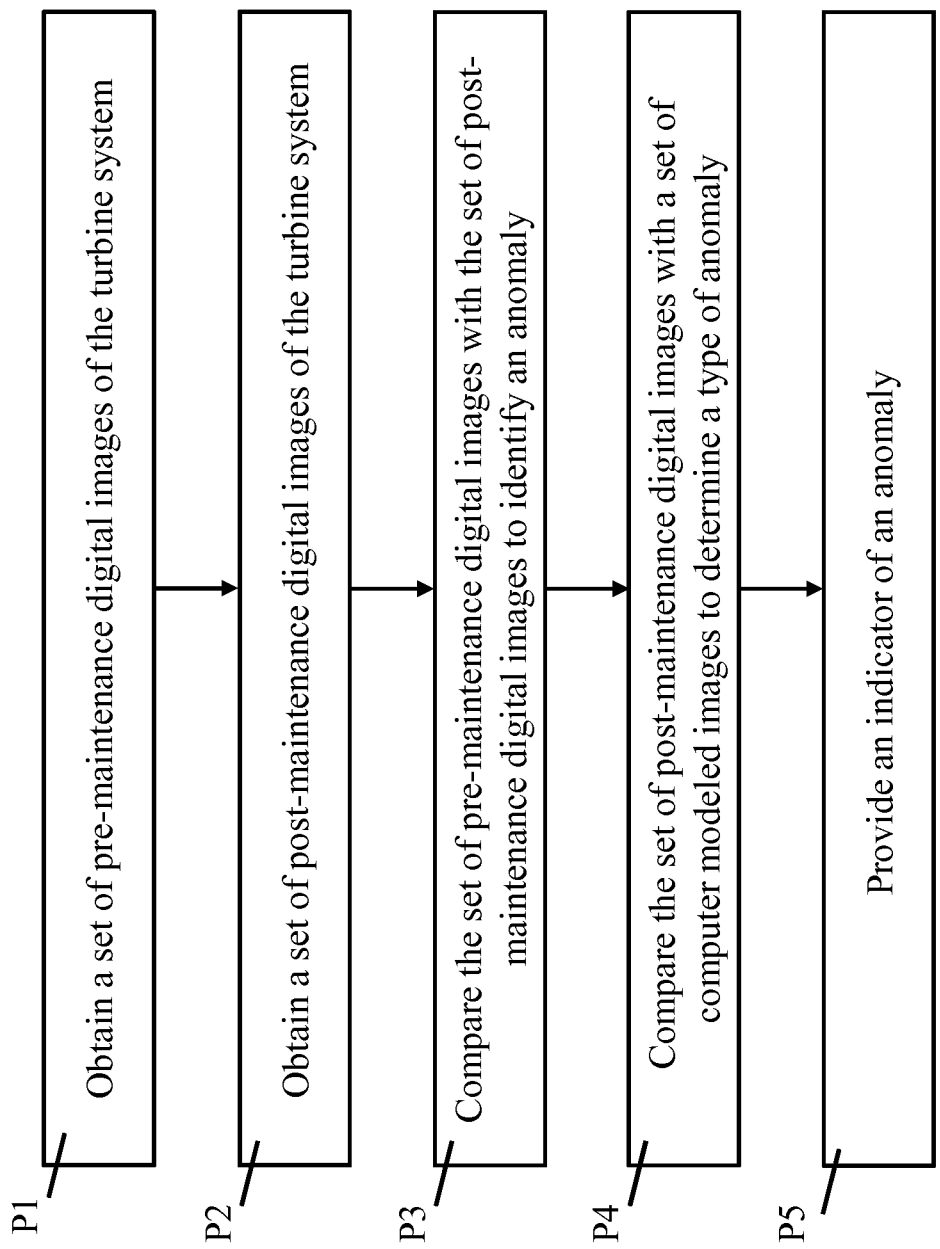
FIG. 2 shows a method flow diagram illustrating processes of inspecting a turbine system according to embodiments of the invention.

Turning to FIG. 2, a method flow diagram is shown illustrating processes in inspecting turbine system 106 according to embodiments of the invention. The process flow illustration in FIG. 2 will be referred to in conjunction with FIGS. 1 and 3-8, and in particular, FIG. 1, which illustrates an environment 100 for performing the actions described with reference to the process flow of FIG. 2.

Returning to FIG. 2, process P1 can include: obtaining a set of pre-maintenance digital images 110 of turbine system 106 (FIG. 1). More specifically, inspection system 102 (FIG. 1) may obtain the set of pre-maintenance digital images 110 from industrial camera 108 by any conventional data transfer technique, for example, but not limited to, directly from industrial camera 108 or a intermediate storage system. As discussed above, the set of pre-maintenance digital images 110 may be obtained by user 112 who may be performing maintenance processes on turbine system 106. That is, user 112 may use industrial camera 108 to capture the set of pre-maintenance digital images 110 prior to performing maintenance processes on the turbine system 106. The set of pre-maintenance digital images 110 may include a plurality of distinct digital images taken by user 112. More specifically, each of the plurality of distinct digital images may be captured by user 112 in distinct areas of the turbine system 106, so the inspection of turbine system 106, as discussed below, may be substantially thorough and complete.

Figure 3:
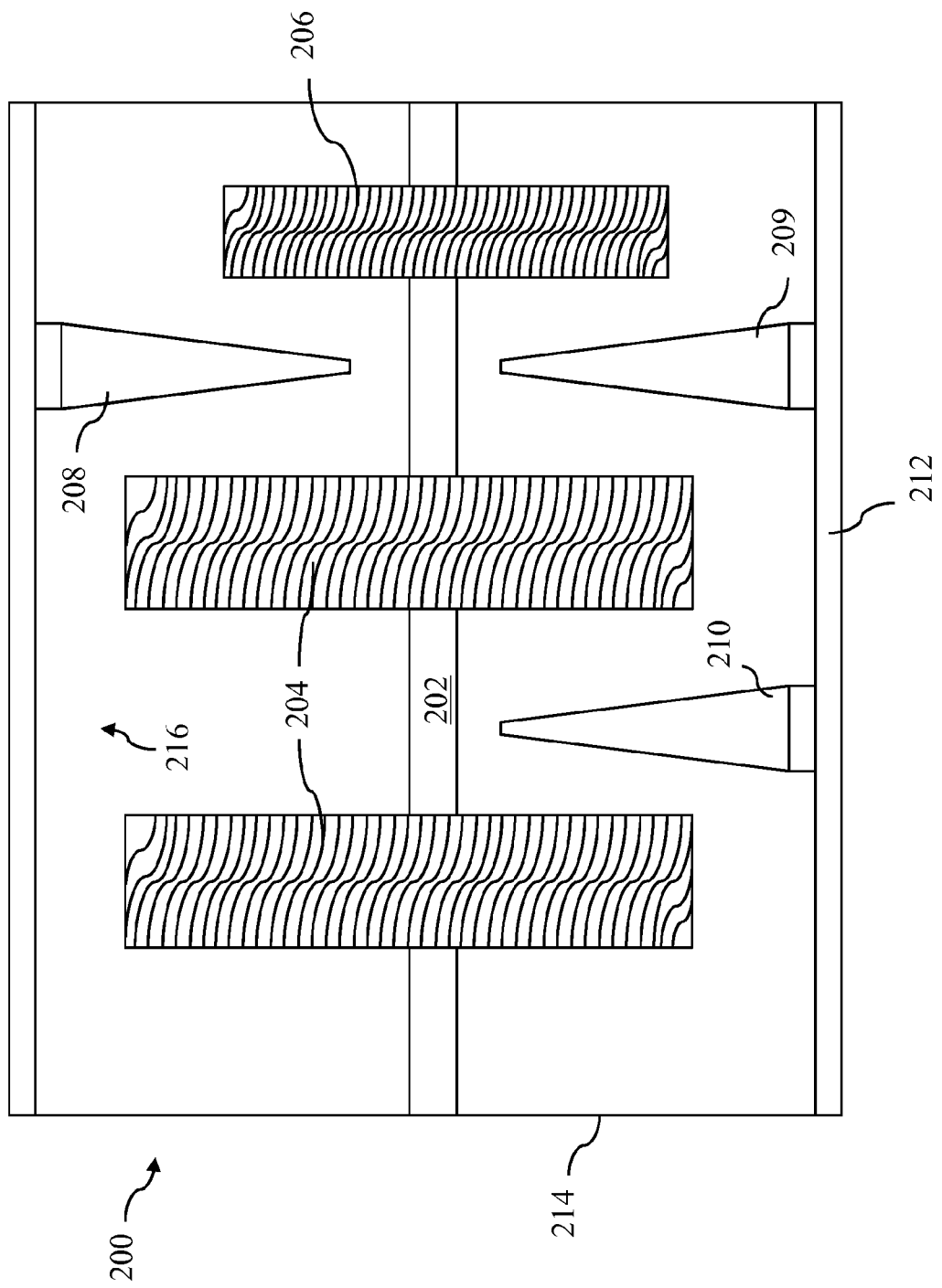
FIG. 3 shows a pre-maintenance digital image of a top perspective view of a portion of a turbine system according to embodiments of the invention.

Turning to FIG. 3, a pre-maintenance digital image 214 of a top perspective view of a portion of turbine system 106 (FIG. 1) is shown, according to embodiments of the invention. As shown in FIG. 3, a single pre-maintenance digital image 214 included in the set of pre-maintenance digital images 110 includes only a portion of a turbine device 200 of turbine system 106 (FIG. 1). More specifically, the portion of turbine device 200 depicted in the single pre-maintenance digital image 214 includes two rows of first stage buckets 204, and one row of middle stage buckets 206. First stage buckets 204 and middle stage buckets 206 may be coupled to rotor shaft 202. Also shown in the single pre-maintenance digital image 214, turbine device 200 may also include a plurality of stator vanes 208-210 coupled to a turbine housing 212. More specifically, turbine device 200 may include stator vanes 208-210 positioned between each set of buckets (e.g., first stage buckets 204, middle stage buckets 206) on both sides of rotor shaft 202. As will be discussed in more detail below with reference to FIGS. 6 and 7, the single pre-maintenance digital image 214 may indicate that a stator vane is missing in region 216 of turbine device 200.

Following process P1, process P2 can include obtaining a set of post-maintenance digital images 114 of turbine system 106 (FIG. 1). The set of post-maintenance digital images 114 may depict turbine system 106 after a maintenance process has been performed on turbine system 106. More specifically, and as similarly discussed above, the set of post-maintenance digital images 114 may be obtained by inspection system 102 of computing device 104 (FIG. 1) after user 112 has completed any maintenance processes that may be performed on turbine system 106. As similarly discussed above with reference to FIGS. 1 and 2, the set of post-maintenance digital images 114 may be captured by user 112 using industrial camera 108 (FIG. 1). Redundant explanation of the obtaining process has been omitted for clarity.

Figure 4:
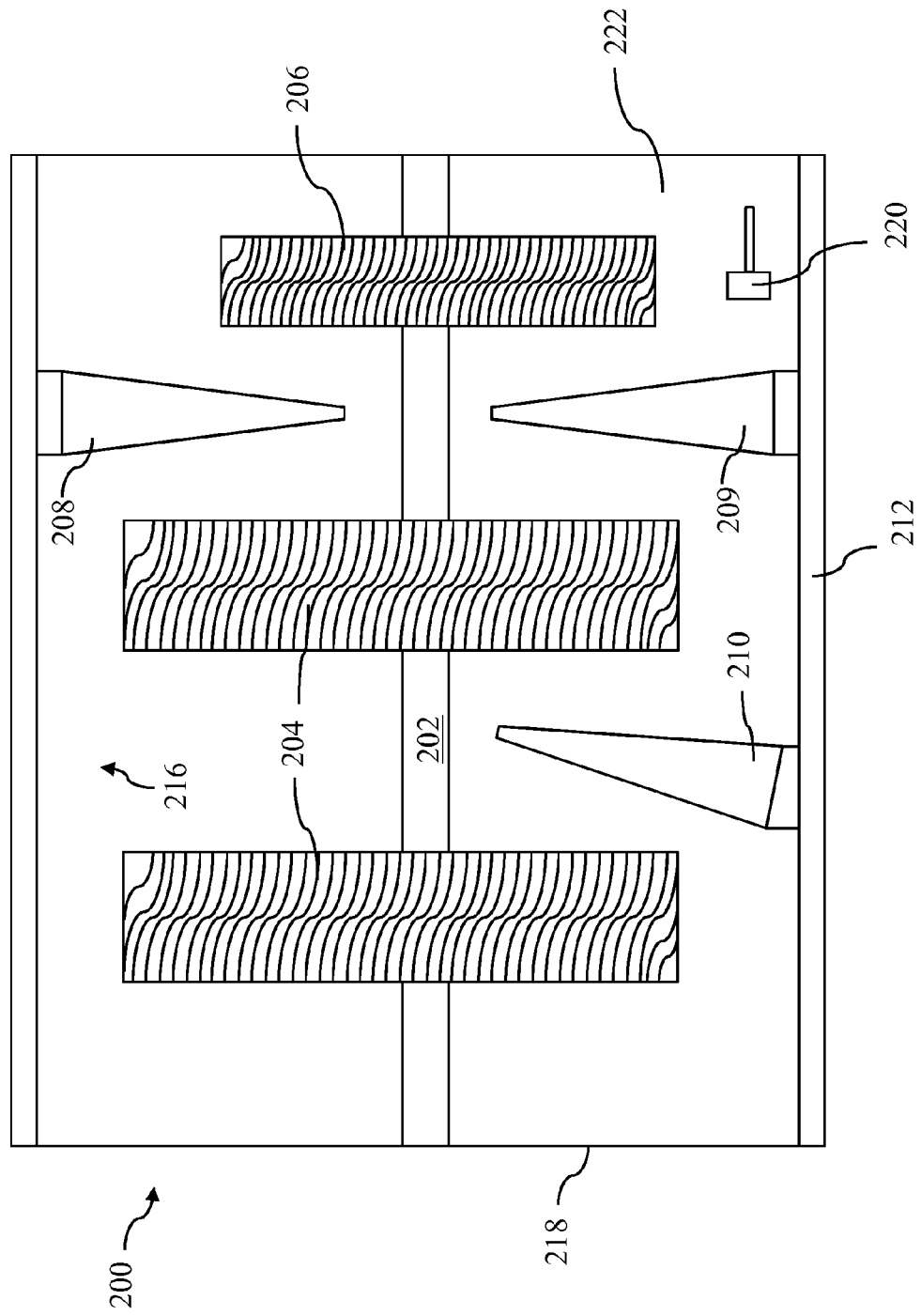
FIG. 4 shows a post-maintenance digital image of a top perspective view of a portion of a turbine system according to embodiments of the invention.

Continuing the example of process P1, in process P2 the set of post-maintenance digital images 114 may be obtained after a maintenance process has been performed on turbine system 106. For example, a maintenance process performed on turbine device 200 of turbine system 106 (FIG. 1) may require that a set of last stage buckets (not shown) be replaced due to material breakdown (e.g., fracturing of the buckets). After the maintenance process (e.g., replacement of the last stage buckets) is performed on turbine device 200, a single post-maintenance digital image 218, as shown in FIG. 4, may be captured by user 112 using industrial camera 108. User 112 may capture the single post-maintenance digital image 218 by an identical technique used to capture the single pre-maintenance digital image 214 (FIG. 3). More specifically, user 112 may capture the single post-maintenance digital image 218 in an identical position of turbine device 200 as user 112 captured the single pre-maintenance digital image 214. By capturing the respective images in an identical position of turbine device 200, the images may provide for an improved comparison process, as discussed in detail below. In the embodiment, as shown in FIG. 4, the single post-maintenance digital image 218 of a portion of turbine device 200 may include similar components as previously discussed with respect to FIG. 3. In the Figures, it is understood that similarly numbered components (e.g., first stage buckets 204, rotor shaft 202, turbine housing 214, etc.) may function in a substantially similar fashion. Redundant explanation of these components has been omitted for clarity.

Also shown in FIG. 4, the single post-maintenance digital image 218 of a portion of turbine device 200 may also include a misaligned stator vane 210. Misaligned stator vane 210 may have become misaligned during the maintenance process (e.g., replacement of the last stage buckets) performed on turbine device 200 of turbine system 106 (FIG. 1). More specifically, user 112 may have caused stator vane 210 to become partially decoupled from turbine housing 214 while performing the maintenance process on turbine device 200.

As shown in FIG. 4, the single post-maintenance digital image 218 of a portion of turbine device 200 may also include an unknown component 220 positioned within turbine device 200. Unknown component 220 may be any component, which is present in turbine device 200 and is not integral with turbine device 200 of turbine system 106 (FIG. 1). For example, as shown in FIG. 4, unknown component 220 may be a hammer used by user 112 during the performed maintenance process (e.g., replacing last stage buckets) on turbine device 200. As shown in FIG. 4, unknown component 220 may be located on a bottom surface 222 of turbine housing 214, and may have been mistakenly left in turbine device 200 by user 112 (FIG. 1) after the maintenance process was performed. In an alternative embodiment, unknown component 220 may have fallen into a confined space of turbine device 200 during the maintenance process. As a result, user 112 (FIG. 1) may not be able to easily locate unknown component 220 and/or may not be able to retrieve unknown component 220 based solely on user's 108 visual inspection of the confined space.

After obtaining the set of post-maintenance digital images 114 of in process P2, process P3 can include comparing the set of pre-maintenance digital images 110 with the set of post-maintenance digital images 114. More specifically in process P3, inspection system 102 may compare the set of pre-maintenance digital images 110 with the set of post-maintenance digital images 114 to identify an anomaly in the set of post-maintenance digital images 114. In an embodiment, as shown in FIG. 1, the inspection system 102 can compare the two digital images to identify a least one anomaly between the two sets of digital images. In an embodiment, inspection system 102 may use any now know or later developed image comparison technique for identifying an anomaly in the set of post-maintenance digital images 114. An anomaly may be identified if inspections system 112 determines there is a distinction between the set of pre-maintenance digital images 110 and the set of post-maintenance digital images 114. If no anomaly is detected by inspection system 102 of computing device 104, user 112 may be notified that turbine system 106 requires no further inspection and/or maintenance and is ready for operation. This notification may be provided to user 112 via a human-machine interface (HMI) 130. HMI 130 may include, but is not limited to an interface, such as a graphical user interface (GUI) or other conventional interface, for providing the notification to user 112.

Figure 5:
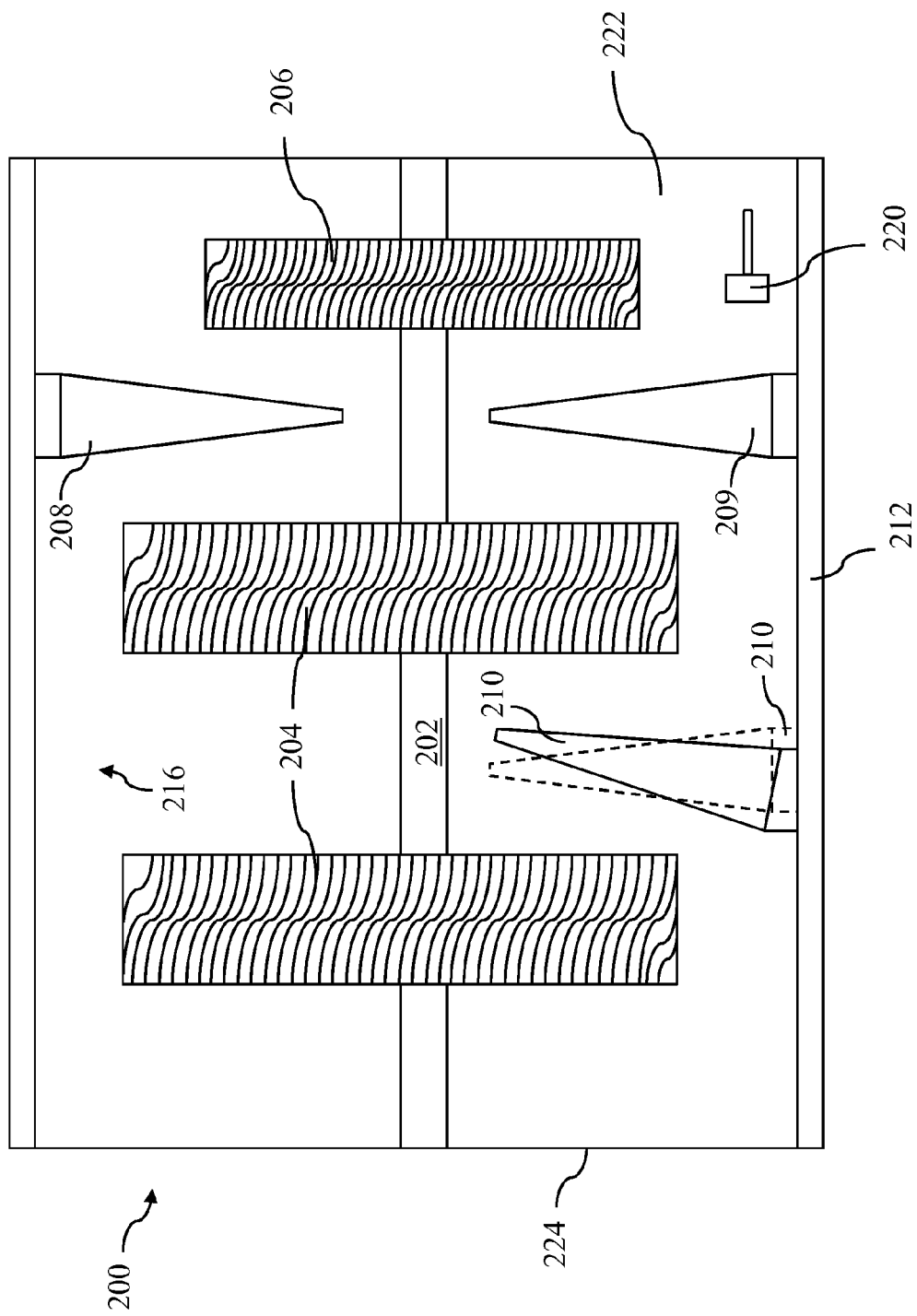
FIG. 5 shows a comparative view of a pre-maintenance digital image of a top perspective view of a portion of a turbine system and a post-maintenance digital image of a top perspective view of a portion of a turbine system according to embodiments of the invention.

Continuing with the example of process P2, and as shown in FIG. 5, inspection system 102 (FIG. 1) may utilize a first overlaying comparison image 224 of single pre-maintenance digital image 214, shown in phantom, and the single post-maintenance digital image 218 to identify any anomalies in the single post-maintenance digital image 218. The first overlaying comparison image 224, as shown in FIG. 5, may allow inspection system 102 (FIG. 1) to identify two anomalies in the single post-maintenance digital image 218 of turbine device 200. Those anomalies, discussed in more detail below, include the misaligned stator vane 210 and unknown component 220. It is understood that the anomalies described herein are not an exhaustive list of anomalies that may be identified by inspection system 102. That is, the anomalies described herein are select examples of anomalies identified by inspection system 102, but the identifiable anomalies are not limited to the examples described herein.

Following process P3, process P4 can include comparing the set of post-maintenance digital images 114 with a set of computer modeled images 120 of turbine system 106 to determine a type of the anomaly in response to identifying an anomaly in process P3. More specifically, if inspection system 102 identifies an anomaly in the set of post-maintenance digital images 114 in process P3, then inspection system 102 may compare the set of post-maintenance digital images 114 to a set of computer modeled images 120 to identify the type of anomaly that exists in turbine system 106 during the comparison in process P4. The comparison of the set of post-maintenance digital images 114 with the set of computer-modeled images 120 of turbine system 106 may be performed using a similar technique as described above with respect to the comparison process performed in process P3. For example, and discussed below, inspection system 102 may provide a second overlaying comparison image (FIG. 7) which may compare the set of post-maintenance digital images 114 and the set of computer modeled images 120. The second overlaying comparison image (FIG. 7) may aid in determining the type of anomaly previously identified in process P3.

Figure 8:
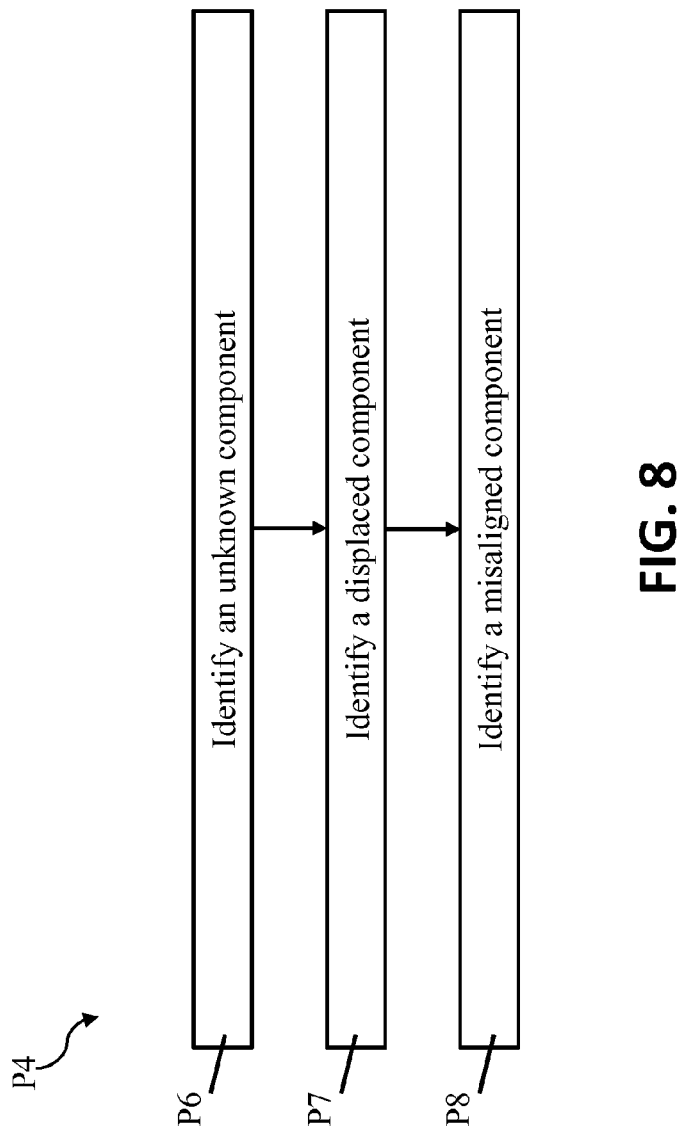
FIG. 8 shows a method flow diagram illustrating processes in identifying a type of anomaly identified during an inspection of a turbine system according to embodiments of the invention.

Briefly turning to FIG. 8, with reference to FIG. 1, the determining of the type of anomaly during the comparison process P4 may include identifying at least one of a plurality of types of anomaly. As shown in FIG. 8, process P4 may include identifying an unknown component (e.g., unknown component 220, FIG. 4) not included in the set of computer modeled images 120 and included in the set of post-maintenance digital images 114, at process P6. More specifically, the inspection system 102 can compare the set of post-maintenance digital images 114 and the set of computer modeled images 120 to determine that an unknown component is present in turbine system 106 after a maintenance process has been performed. Also shown in FIG. 8, process P4 may include identifying a displaced component (e.g., displaced stator vane 226, FIG. 6) included in the set of computer modeled images 120 of turbine system 106 and missing from the set of post-maintenance digital images 114, at process P7. In identifying a displaced component, inspection system 102 of computing device 104 may determine that a component integral with turbine system 106 is not present the set of post-maintenance digital images 114. Where the component is not present in the set of post-maintenance digital images 114, the component is not physically present in turbine system 106. Finally, as shown in FIG. 8, process P4 may include identifying a misaligned component (e.g., misaligned stator vane 210) at process P8. In process P8, the identified misaligned component may be included in the set of computer modeled images 120 in a first alignment, and may also be included in the set of post-maintenance digital images 114 in a second alignment, distinct from the first alignment. That is, inspection system 102 may compare the set of post-maintenance digital images 114 and the set of computer modeled images 120 and determine that a component (e.g., misaligned stator vane 210 FIGS. 4 and 5) may be positioned in distinct alignments when comparing the two sets of images. As discussed above, inspection system 102 may use any now know or later developed image comparison technique for determining the type of anomaly in the set of post-maintenance digital images 114.

Inspection system 102 may retrieve the set of computer modeled images 120 of turbine system 106 from a library 116 of a plurality of computer modeled images 118 for a plurality of distinct turbine systems (not shown). More specifically, inspection system 102 may first determine which specific type of turbine system (e.g., turbine system 106) is being inspected. After determining the specific type of turbine system, inspection system 102 may retrieve the set of computer modeled images 120 associated with that specific turbine system (e.g., turbine system 106) from the plurality of computer modeled images 118. The set of computer modeled images 120 may include any now known or later developed computer rendered images of turbine system 106, such as, but not limited to, two-dimensional or three-dimensional computer aided-design (CAD) drawings. The set of computer modeled images 120 of turbine system 106 may also include a modeled image for all components (e.g., first stage buckets 204, stator vanes 208-210, rotor shaft 202, etc.) in turbine system 106. By including a computer model for all components of turbine system 106, inspection system 102 may identify anomalies in whole components of the turbine system 106 (e.g., misaligned stator vane 210). Additionally, inspection system 102 may also identify anomalies that exist in a sub-component of a single component of turbine system 106 (e.g., single broken blade on a set of first stage buckets 204).

Figure 6:
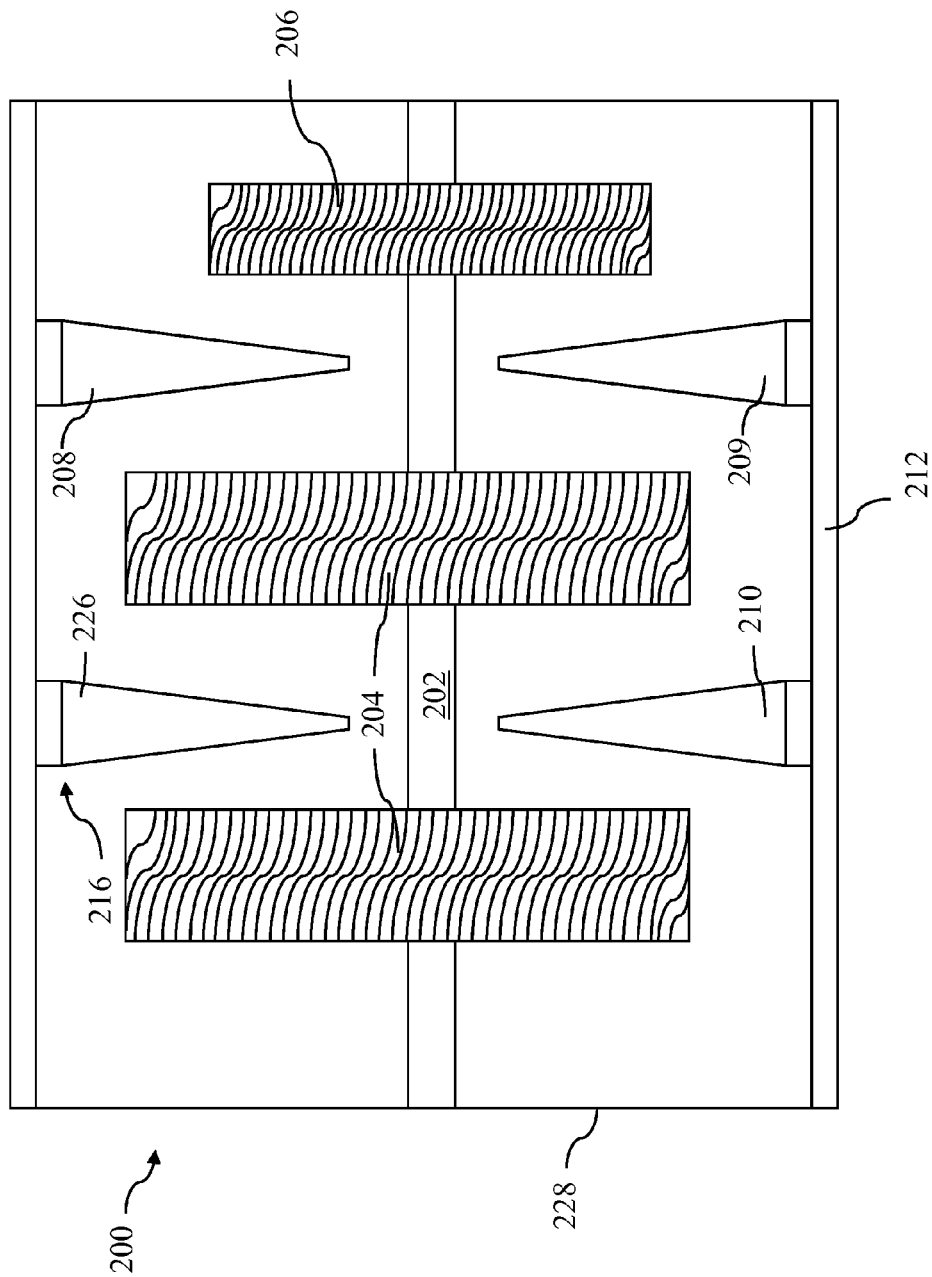
FIG. 6 shows a computer modeled image of a top perspective view of a portion of a turbine system according to embodiments of the invention.
Figure 7:
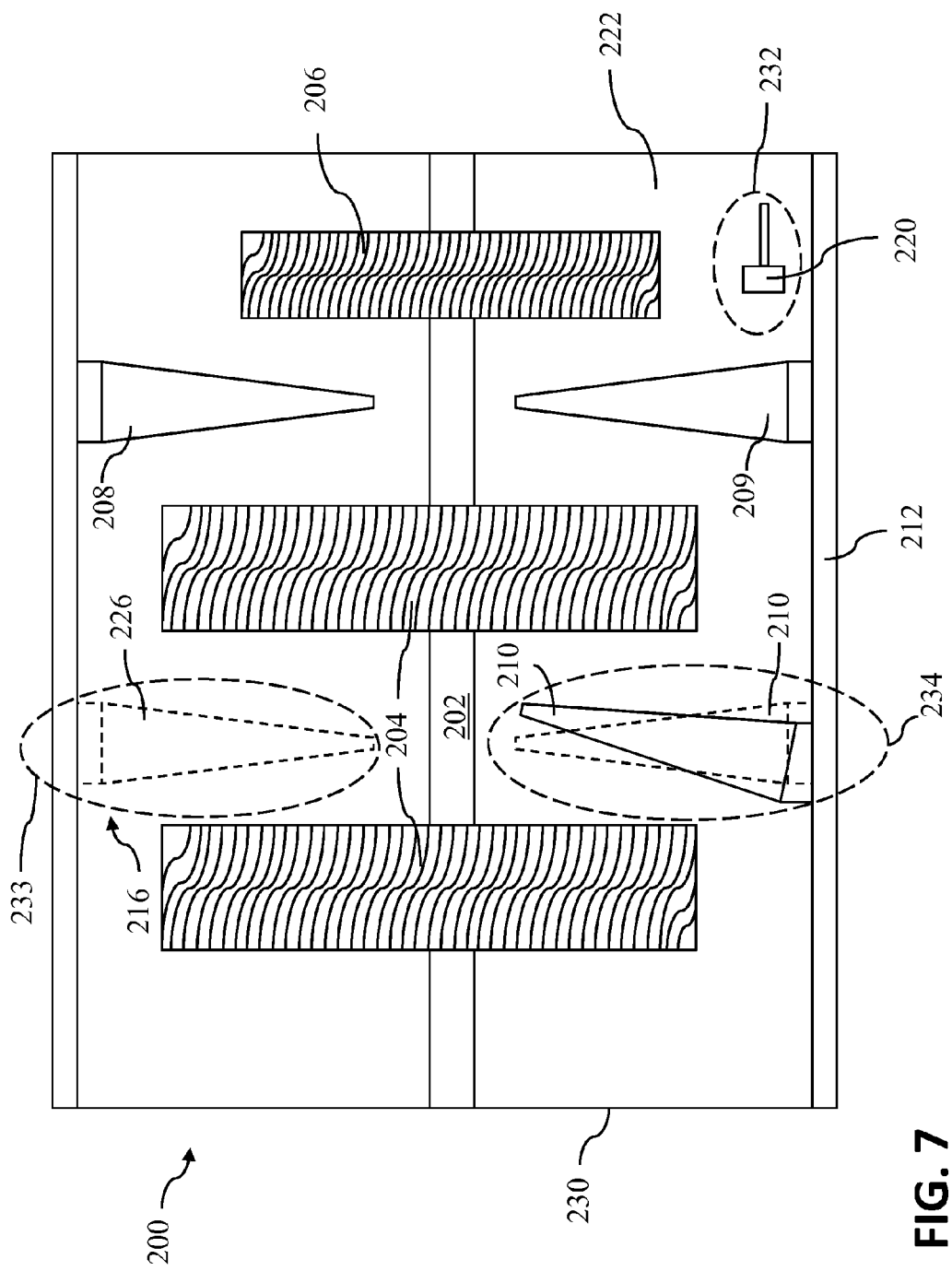
FIG. 7 shows a comparative view of a post-maintenance digital image of a top perspective view of a portion of a turbine system and a computer modeled image of a top perspective view of a portion of a turbine system according to embodiments of the invention.

Continuing the example of process P3, and with reference to FIGS. 6 and 7, inspection system 102 may identify an anomaly in the single post-maintenance digital image 218 (FIG. 5) and may retrieve the set of computer modeled images 120 (FIG. 1) which includes a single computer modeled image 228. As shown in FIGS. 6 and 7, single computer modeled image 228 includes a computer modeled image of a portion of turbine device 200 of turbine system 106 that may be substantially identical to the single post-maintenance image 218 (FIG. 4). As shown in FIG. 6, single computer modeled image 228 of a portion of turbine device 200 may include similar components as previously discussed with respect to FIGS. 3 and 4. However, as shown in FIG. 6, region 216 of turbine device 200 includes displaced stator vane 226, which is not present in single post-maintenance image 218 (FIG. 4). In the example, as shown in FIG. 7, after inspection system 102 of retrieves single computer modeled image 228, inspection system 102 may provide second overlaying comparison image 230. The second overlaying comparison image 230, including the single post-maintenance digital image 218 and the single computer modeled image 228 (shown in phantom), may determine the type of anomalies present in turbine device 200. As shown in FIG. 7, three distinct types of anomalies may be determined by inspection system 102. In the example, inspection system may first identify that unknown component 220 may be present in turbine device 200. During the comparison process (e.g., process P4), inspection system 102 may identify that unknown component 220 is present in the single post-maintenance digital image 218. Additionally, inspection system 102 may also identify that unknown component 220 is not an integral component of turbine device 200 because unknown component 220 is not modeled in single computer modeled image 228. As such, a first type of anomaly determined by inspection system 102 may be an identified unknown component in turbine device 200.

Continuing the example of process P3, and as seen in FIG. 7, inspection system 102 may also identify that displaced stator vane 226 may not be present in region 216 of turbine device 200. More specifically, during the comparison process (e.g., process P4), inspection system 102 may identify that displaced stator vane 226 is not present in the single post-maintenance digital image 218. Additionally, inspection system 102 may also identify that displaced stator vane 226 is an integral component of turbine device 200 because displaced stator vane 226 is modeled in single computer modeled image 228 of turbine device 200. As such, a second type of anomaly determined by inspection system 102 may be an identified displaced component (e.g., displaced stator vane 226) in turbine device 200. Finally, in the example shown in FIG. 7, inspection system 102 may identify that stator vane 210 is misaligned in turbine device 200. That is, during the comparison process (e.g., process P4), inspection system 102 may identify that stator vane 210 is included in the single computer modeled image 228 in a first alignment (shown in phantom). Additionally during the comparison process (e.g., process P4), inspection system 102 may also identify that stator vane 210 is included in the single post-maintenance digital image 218 in a second alignment, distinct from the first alignment. As such, a third type of anomaly determined by inspection system 102 may be an identified misaligned component (e.g., stator vane 210) in turbine device 200.

Following process P4, process P5 can include providing an indicator of an anomaly to user 112. More specifically, inspection system 102 of computing device 104 may provide user 112 with an indicator of an anomaly using human-machine interface 130. The provided indicator of the anomaly may notify user 112 whether it is acceptable to allow turbine system 106 to begin operation after the maintenance process has been performed. The indicator may be provided to user 112 via HMI 130, as one of a plurality of conventional indicators including, but not limited to, an auditory indicator (e.g., siren), or a visual indicator (e.g., light, print out).

In various embodiments of the invention, each type of anomaly determined in process P4 may also be associated with a pre-determined severity level, and the provided indicator in process P5 may be based on the pre-determined severity level. More specifically, each type of determined anomaly may include a pre-determined severity level of either low importance or high importance. For an anomaly including a pre-determined severity level of low importance, the provided indicator may be a warning indicator. The warning indicator may inform user 112 that actions may not be necessary before turbine system 106 becomes operational after a maintenance process has been performed. For an anomaly including a pre-determined severity level of high importance, the provided indicator may be an alarm indicator. The alarm indicator may inform user 112 that actions are necessary before turbine system 106 becomes operational after a maintenance process has been performed. That is, the alarm indicator may display on human-machine interface 130 that the turbine system 106 is not ready for operation until the determined anomaly of turbine system 106 is corrected. In an embodiment, as shown in FIG. 2, computing device 104 may also prevent turbine system 106 from generating power (e.g., becoming operational) if an alarm indicator is provided to user 112. That is, computing device 100 may make turbine system 106 inoperable until the anomaly, which includes the pre-determined high importance severity level, is corrected.

In addition to providing user 112 with an indicator based on the pre-determined severity level, inspection system 102 of computing device 104 may also provide user 112 with the type of anomaly determined by inspection system 102 using human machine interface 130. More specifically, inspection system 102 may provide an indicator to HMI 130, with the type of anomaly determined (e.g., unknown component, displaced component, misaligned component) and a digital image from the set of post-maintenance digital images 114 which may include the determined anomaly. The digital image of the set of post-maintenance digital images 114 may include highlighted portions 232-234 (FIG. 7) and/or a description, which may allow user 112 to determine where the anomaly exists in turbine system 106. This may allow user 112 to correct the anomaly before turbine system 106 becomes operational.

Continuing the example of process P4, with reference to FIGS. 2 and 7, process P5 may provide user 112, with three high importance alarm indicators for the three types of determined anomalies that exist in turbine device 200 of turbine system 106. More specifically, inspection system 102 may provide an alarm indicator for the unknown component 220 identified in turbine device 200, the displace stator vane 226 of turbine device 200, and the misaligned stator vane 210 of turbine device 200. Inspection system 102 may provide these alarm indicators to user 112 via HMI 130, which may be a conventional GUI. The alarm indicators provided by inspection system 102 may provide distinct messages on the GUI to notify user 112 of the determined anomalies. In each distinct message, GUI may display second overlaying comparison image 230, as shown in FIG. 7. More specifically, each distinct message may provide second overlaying comparison image 230 with highlighted portions 232-234 circled, so user 112 may easily identify the portion of turbine device 200 that contains the anomaly.

After the anomalies have been identified and made known to user 112, user 112 may then correct the anomaly included in turbine device 200. User 112 may then run the inspection process (P1-P5) again to determine if any anomalies still exist in turbine system 106. Once all anomalies are corrected, or it is determined that all existing anomalies include a severity level of low importance (e.g., no action necessary), turbine system 106 may be operational again.

Technical effects of the invention, include, but are not limited to comparing the set of pre-maintenance digital images with the set of post-maintenance digital images to identify an anomaly in the set of post-maintenance digital images, and comparing the set of post-maintenance digital image with a set of computer modeled images of the turbine system to determine a type of the anomaly in response to identifying the anomaly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    at least one computing device configured to inspect a turbine system by performing actions including:
        obtaining a set of pre-maintenance digital images of the turbine system;
        obtaining a set of post-maintenance digital images of the turbine system, the post-maintenance digital images depicting the turbine system after a maintenance process has been performed on the turbine system;

comparing the set of pre-maintenance digital images with the set of post-maintenance digital images to identify an anomaly in the set of post-maintenance digital images; and comparing the set of post-maintenance digital images with a set of computer modeled images of the turbine system to determine a type of the anomaly in response to identifying the anomaly.

2. The system of claim 1, wherein the obtaining of the set of pre-maintenance digital images is performed by capturing the set of pre-maintenance digital images using an industrial camera, and wherein the obtaining of the set of post-maintenance digital images is performed by capturing the set of post-maintenance digital images using the industrial camera.

3. The system of claim 1, wherein the at least one computing device further performs actions including:

retrieving the set of computer modeled images of the turbine system from a library of a plurality of computer modeled images for a plurality of distinct turbine systems.

4. The system of claim 1, wherein the set of computer modeled images of the turbine system includes a computer modeled image for all components in the turbine system.

5. The system of claim 1, wherein the determining of the type of the anomaly includes at least one of:

identifying an unknown component not included in the set of computer modeled images of the turbine system and included in the set of post-maintenance digital images, identifying a displaced component included in the set of computer modeled images of the turbine system and missing from the set of post-maintenance digital images, or identifying a misaligned component included in the set of computer modeled images of the turbine system in a first alignment and included in the set of post-maintenance digital images in a second alignment, distinct from the first alignment.

6. The system of claim 1, wherein the type of the anomaly is associated with a pre-determined severity level.

7. The system of claim 6, wherein the at least one computing device further performs actions including:

providing an indicator based on the pre-determined severity level in response to the determining of the type of the anomaly.

8. A program product stored on a non-transitory computer readable medium for inspecting a turbine system, the non-transitory computer readable medium comprising program code for causing the computer system to:

obtain a set of pre-maintenance digital images of the turbine system;

obtain a set of post-maintenance digital images of the turbine system, the post-maintenance digital images depicting the turbine system after a maintenance process has been performed on the turbine system;

compare the set of pre-maintenance digital images with the set of post-maintenance digital images to identify an anomaly in the set of post-maintenance digital images; and compare the set of post-maintenance digital image with a set of computer modeled images of the turbine system to determine a type of the anomaly in response to identifying the anomaly.

9. The program product of claim 8, further comprising program code for causing the computer system to:

retrieve the set of computer modeled images of the turbine system from a library of a plurality of computer modeled images for a plurality of distinct turbine systems.

10. The program product of claim 8, wherein the set of computer modeled images of the turbine system includes a computer modeled image for all components in the turbine system.

11. The program product of claim 8, wherein the determining of the type of the anomaly includes at least one of:

identifying an unknown component not included in the set of computer modeled images of the turbine system and included in the set of post-maintenance digital images, identifying a displaced component included in the set of computer modeled images of the turbine system and missing from the set of post-maintenance digital images, or identifying a misaligned component included in the set of computer modeled images of the turbine system in a first alignment and included in the set of post-maintenance digital images in a second alignment, distinct from the first alignment.

12. The program product of claim 8, wherein the type of the anomaly is associated with a pre-determined severity level.

13. The program product of claim 12, further comprising program code for causing the computer system to:

provide an indicator based on the pre-determined severity level in response to the determining of the type of the anomaly.

14. A method of inspecting a turbine system, the method comprising:

obtaining a set of pre-maintenance digital images of the turbine system;

obtaining a set of post-maintenance digital images of the turbine system, the post-maintenance digital images depicting the turbine system after a maintenance process has been performed on the turbine system;

comparing the set of pre-maintenance digital images with the set of post-maintenance digital images to identify an anomaly in the set of post-maintenance digital images; and comparing the set of post-maintenance digital image with a set of computer modeled images of the turbine system to determine a type of the anomaly in response to identifying the anomaly.

15. The method of claim 14, wherein the obtaining of the set of pre-maintenance digital images is performed by capturing the set of pre-maintenance digital images using an industrial camera, and wherein the obtaining of the set of post-maintenance digital images is performed by capturing the set of post-maintenance digital images using the industrial camera.

16. The method of claim 14, further comprising:

retrieving the set of computer modeled images of the turbine system from a library of a plurality of computer modeled images for a plurality of distinct turbine systems.

17. The method of claim 14, wherein the set of computer modeled images of the turbine system includes a computer modeled image for all components in the turbine system.

18. The method of claim 14, wherein the determining of the type of the anomaly includes at least one of:

identifying an unknown component not included in the set of computer modeled images of the turbine system and included in the set of post-maintenance digital images, identifying a displaced component included in the set of computer modeled images of the turbine system and missing from the set of post-maintenance digital images, or identifying a misaligned component included in the set of computer modeled images of the turbine system in a first alignment and included in the set of post-maintenance digital images in a second alignment, distinct from the first alignment.

19. The method of claim 14, wherein the type of the anomaly is associated with a pre-determined severity level.

20. The method of claim 19, further comprising:
providing an indicator based on the pre-determined severity level in response to the determining of the type of the anomaly.

* * * * *